UNITED STATES PATENT OFFICE 2,508,364

REACTIONS OF LOWER TRIALKYL PHOSPHITES WITH SULFOXY HALIDES AND PRODUCTS THEREOF

Alan Bell, Kingsport, Tenn., assignor to Eastman Kodak Company, Rochester, N. Y., a corporation of New Jersey No Drawing. Application December 26, 1946, Serial No. 718,615

8 Claims. (Cl. 260—456)

This invention relates to the preparation of insecticides by reacting together trialkyl phosphites and phosphorus or sulfur halides. The initial reaction products which contain active halogen groups may be further reacted with water, alcohols, amines, or mercaptans to replace the active chlorine groups. The initial reaction products may be heated at an elevated temperature to remove the halogen therefrom in the form of alkyl halide. All of the materials obtained by these reactions are useful as insecticides.

Insecticides ordinarily divide themselves up into those of the contact type, the most commonly known members of which are nicotine sulfate, pyrethrum, and rotenone, and those which poison by ingestion thereof. In recent years new materials of the contact insecticidal type have been developed, the most commonly known of these new materials being DDT and Bladan, the latter a German development.

It is an object of my invention to provide a new type of phosphorus compounds which have greatly improved properties as contact and stomach insecticides. Another object of my invention is to provide a method for preparing insecticidal materials in which trialkyl phosphites are employed as the starting materials. A further object of my invention is to provide a method of preparing insecticidal materials in which phosphorus or sulfur halides are employed as the starting material. Other objects of my invention will appear herein.

I have found that the residues resulting from the reaction of organic phosphites with phosphorus or sulfur chlorides and their derivatives are useful as contact and stomach insecticides and display toxic properties superior to those of many of the contact insecticides which are available at the present time. The reaction between the trialkyl phosphite and thionyl chloride, for example, takes place in accordance with the following equation:

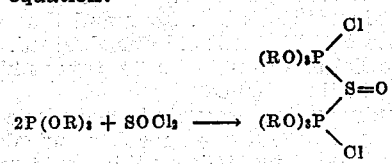

The material which is formed thereby may be further treated so as to displace the chlorine substituents. For instance, if this compound is subjected to heat, the reaction which occurs is as follows:

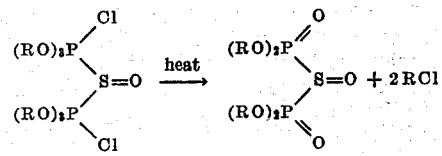

If this compound is reacted with an alcohol, an amine, or a mercaptan, the alkyl of which is represented by R', the reaction which occurs is represented by the following equation:

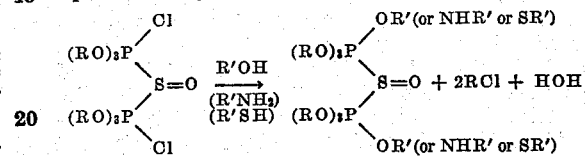

Similar reactions occur with the phosphorus tri- or penta-halides, oxyhalides, thiohalides, or sulfuryl halides. For instance, the reaction of a trialkyl phosphite and phosphorus trichloride may be formulated as follows:

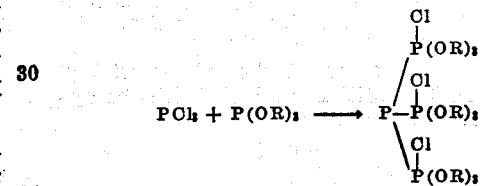

With the other active halogens corresponding reactions occur.

With phosphorus pentachloride the reaction which probably occurs is as follows:

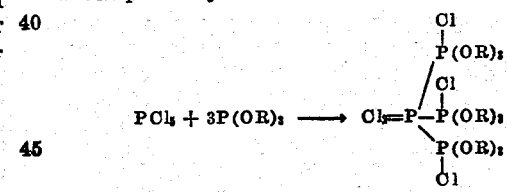

The five halogens which are present in this product may all be replaced by alcohols, mercaptans, or amines in a corresponding manner to that shown in the equation above where the reaction product of trialkyl phosphite and thionyl chloride is reacted with alcohol. In general, any material with an active halogen will enter into this reaction, and the products exhibit insecticidal properties. Some of the halides which are useful in this reaction are phosphorus trichloride, phosphorus pentachloride, thionyl chloride, thionyl bromide, sulfuryl chloride, sulfuryl bromide, phosphorus oxychloride, and the like.

As the term "trialkyl phosphite" is employed herein, it is to be understood as referring to the lower alkyl phosphites. The aryl phosphites and the mixed alkyl aryl phosphites are also included within the scope of my invention. Although the ethyl phosphites are the most commonly available, other phosphites which might be employed are the propyl, butyl, amyl, or methyl phosphites or, in fact, any of the phosphites, the alkyl groups of which contain not more than eight carbon atoms. Mixed alkyl phosphites, such as ethyl propyl or ethyl butyl might be employed. Of the aryl phosphites the phenyl and cresyl phosphites are the most commonly known and would be the most useful of that class of compounds. Mixed alkyl aryl phosphites, such as ethyl phenyl or ethyl cresyl phosphites might be employed as the starting material in our process. The reaction which is employed is carried out under substantially anhydrous conditions. As the reaction usually occurs with considerable vigor, often cooling or accurate temperature control is desirable. In some cases, however, heating is necessary to promote the reaction.

The following examples illustrate my invention:

*Example 1.*—50 parts of triethylphosphite were dissolved in 50 parts of ether, and the mass was ice-cooled. This solution was slowly treated with 18 parts of thionyl chloride while maintaining the temperature below 20° C. Ether was evaporated and a residue was obtained which, upon analysis, showed a sulfur content of 7.07% and a chlorine content of 14.8%. This indicated the structural formula of a di-triethylchlorphosphidosulfite. The residue so obtained was heated to 100–120° C. and held at that temperature for one-half hour. Ethyl chloride was given off. When the ethyl chloride had all been given off, the heating was stopped. There was obtained 50 parts of a water-insoluble colorless oil having a sulfur content of 9.4% and a phosphorus content of 20.6%. This analysis indicated that a di-diethylphosphidosulfite was obtained.

*Example 2.*—An ether solution of the triethyl phosphite-SOCl₂ addition product (with the apparent formula of

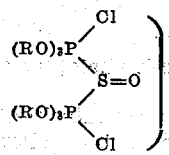

was prepared from 50 parts of triethyl phosphite in the manner described in Example 1. To this solution there was slowly added with cooling 60 parts of cyclo hexylamine dissolved in 50 parts of ether. The resulting cyclo hexylamine hydrochloride was filtered, and the filtrate was evaporated. The residual liquid dissolved in benzene was washed several times with water, dried over sodium sulfide, and evaporated under reduced pressure at 80–90° C. 65 parts of a colorless oil were obtained believed to be comprised mainly of a phosphorus compound having the following formula:

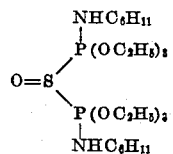

*Example 3.*—An ether solution of triethyl phosphitethionyl chloride addition product (with the apparent formula of

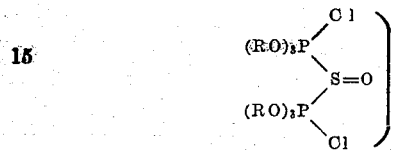

was prepared as in Example 1 using 50 parts of phosphite and 18 parts of thionyl chloride. The solution was treated with 14 parts of ethanol, and the ice-cooled mixture was then slowly mixed with 24 parts of pyridine. The pyridine hydrochloride which formed was removed by filtration, and the filtrate was evaporated. 60 parts of a colorless oil believed to be comprised mainly of a phosphorus compound whose formula is

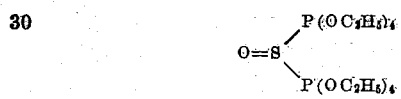

were obtained.

*Example 4.*—35 parts of triethyl phosphite and 8.5 parts of phosphorus trichloride were heated together at 90° C. for one hour. Red phosphorus separated and was filtered off. The filtrate was mixed with 7.2 parts of ethanol and a vigorous reaction resulted. The solution was then warmed at 70–80° C. for one-half hour when the evolution of ethyl chloride had ceased. The resulting insecticidal is believed to be a polyethyl triphosphate.

*Example 5.*—16.6 parts of triethyl phosphite were treated slowly with cooling with 12.4 parts of α,β-di-chloropropiononitrile. The temperature was maintained for a time below 30° C. The solution was then heated to 100–120° C. for one-half hour or until ethyl chloride ceased to be evolved. 20 parts of a dark-colored oil were obtained which for the most part was a compound having the following formula:

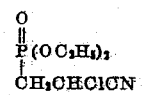

The compounds prepared in accordance with my invention are eminently suitable for insecticidal purposes and appear to have toxicity much superior to many contact insecticides which are available at the present time.

Dusts of ½% concentration were prepared of the products resulting in Examples 1 and 5. These dusts were tested on German roaches. It was found with the dust prepared using the product of Example 1 that an 80 percent kill was obtained in one-half hour and that within two hours a 100 percent kill was obtained. With the material of Example 5 a 30 percent kill was obtained in three hours.

Not only are the products in accordance with my invention useful upon roaches, but also are effective against plant lice, aphids, spiders, flies, bean beetles, Harlequin bugs, and the like. These products may be employed in the form of dusts or in the form of sprays, either as emulsions or solutions.

Although the ethyl substituted insecticides in accordance with my invention are more rapidly effective than insecticides of this type having other alkyl groups thereon, it has often been found that the higher alkyl substituted compounds exert their toxic action for a prolonged period. Therefore, it is often desirable to mix the ethyl compounds with compounds having higher alkyl groups, such as propyl or butyl, to give insecticides which are immediately effective but yet have a prolonged action. It would also be desirable in some instances to mix products, such as prepared by Example 1, with other compounds of this type, such as those prepared in accordance with the process described in Example 5 to give both immediate effectiveness and effectiveness over a prolonged period of time.

I claim:

1. The process which comprises reacting triethyl phosphite with thionyl chloride, said reaction being carried out in liquid phase under substantially anhydrous conditions.

2. The process which comprises reacting a lower trialkyl phosphite with thionyl chloride, said reaction being carried out in the liquid phase under substantially anhydrous conditions.

3. The process which comprises reacting a lower trialkyl phosphite with thionyl chloride, said reaction being carried out in the liquid phase in the presence of an inert organic solvent and under substantially anhydrous conditions.

4. The process which comprises incorporating a lower trialkyl phosphite in an inert organic solvent under substantially anhydrous conditions, slowly incorporating thionyl chloride into reactive contact with said phosphite and permitting reaction therewith to take place, cooling the reaction, removing at least a part of said solvent and heating the reaction product obtained in the aforesaid reaction to volatize off substantially all of the chlorine therein as alkyl chloride.

5. The compound having the formula:

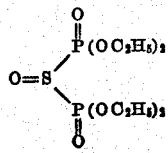

6. The process for preparing an addition product which comprises reacting together a lower trialkyl phosphite with a halide reagent from the group consisting of thionyl chloride, thionyl bromide, sulfuryl chloride and sulfuryl bromide, said reacting being carried out in the liquid phase under substantially anhydrous conditions and with cooling.

7. The process which comprises reacting together a lower trialkyl phosphite with a halide reagent from the group consisting of thionyl chloride, thionyl bromide, sulfuryl chloride, and sulfuryl bromide, said reacting being carried out in the liquid phase under substantially anhydrous conditions with cooling, and heating the addition product obtained by the aforesaid reacting to volatilize off substantially all of the halogen therein as alkyl halide.

8. The compound having the formula:

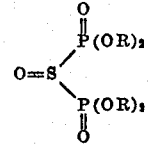

R being a lower alkyl radical.

ALAN BELL.

REFERENCES CITED

The following references are of record in the file of this patent:

UNITED STATES PATENTS

| Number | Name | Date |
|---|---|---|
| 2,242,260 | Prutton | May 20, 1941 |
| 2,336,302 | Schrader | Dec. 7, 1943 |
| 2,370,786 | Fox | Mar. 6, 1945 |

FOREIGN PATENTS

| Number | Country | Date |
|---|---|---|
| 311,935 | Italy | Oct. 16, 1933 |

OTHER REFERENCES

B. I. O. S. Final Report No. 1808, item 22, "Synthetic Insecticides" (Interrogation of Dr. Gerhard Schrader). Dated 1947, released Oct. 4, 1948, page 5.

Chem. and Eng. News, Sept. 10, 1945, pages 1520–1521. Mellor, "Modern Inorganic Chemistry" (Rev. ed. 1939, page 480).